United States Patent
Kusy et al.

(10) Patent No.: US 12,112,228 B2
(45) Date of Patent: Oct. 8, 2024

(54) ARTICLE HANDLING SYSTEM AND METHOD

(71) Applicant: SITA Information Networking Computing UK Limited, Hayes (GB)

(72) Inventors: Viktor Kusy, Prague (CZ); Alexandr Lichy, Prague (CZ)

(73) Assignee: SITA Information Networking Computing UK Limited (GB)

( * ) Notice: Subject to any disclaimer, the term of this patent is extended or adjusted under 35 U.S.C. 154(b) by 203 days.

(21) Appl. No.: 17/619,114

(22) PCT Filed: Jun. 19, 2020

(86) PCT No.: PCT/GB2020/051486
§ 371 (c)(1),
(2) Date: Dec. 14, 2021

(87) PCT Pub. No.: WO2020/254818
PCT Pub. Date: Dec. 24, 2020

(65) Prior Publication Data
US 2022/0292273 A1    Sep. 15, 2022

(30) Foreign Application Priority Data

Jun. 20, 2019  (GB) ...................................... 1908848
Dec. 10, 2019  (EP) ...................................... 19215018

(51) Int. Cl.
*G06K 7/10*      (2006.01)
*B64F 1/32*      (2006.01)
(Continued)

(52) U.S. Cl.
CPC ............ *G06K 7/10445* (2013.01); *B64F 1/32* (2013.01); *B64F 1/368* (2013.01); *G06Q 10/0833* (2013.01); *G06K 2007/10524* (2013.01)

(58) Field of Classification Search
CPC ....... G06K 7/10445; B64F 1/32; B64F 1/368; G06Q 10/0833
(Continued)

(56) References Cited

U.S. PATENT DOCUMENTS 6,222,452 B1 * 4/2001 Ahlstrom ........... G06K 19/0723
340/568.1
6,961,000 B2 * 11/2005 Chung .................. G06Q 10/10
713/168
(Continued)

FOREIGN PATENT DOCUMENTS

| EP | 3113090 A1 | 1/2017 |
|----|------------|--------|
| JP | 2002362730 A | 12/2002 |
| WO | 2020254818 A | 12/2020 |

OTHER PUBLICATIONS

Search Report issued in European Patent Appliation No. 19215018. 3-1222 dated June 4, 2020—(completed May 19, 2020); 9 pages.
(Continued)

*Primary Examiner* — Kerri L McNally
(74) *Attorney, Agent, or Firm* — Morris, Manning & Martin, LLP; Daniel E. Sineway, Esq.; Adam J. Thompson, Esq.

(57) ABSTRACT

There is provided an article handling system, method and computer program product for uniquely identifying an article. The system comprises a mobile device having scanning means that obtains a first article identifier and a second article identifier from one or more article tags associated with an article. A mobile application on the mobile device generates a message comprising a first message line including the first article identifier and a second message line including the second article identifier, and sends the message to a destination location. In this way, the article may be
(Continued)

subsequently identified at the destination location using either or both of the first article identifier or the second article identifier.

20 Claims, 14 Drawing Sheets

(51) Int. Cl.
*B64F 1/36* (2017.01)
*G06Q 10/0833* (2023.01)

(58) Field of Classification Search
USPC ...................................................... 340/572.1
See application file for complete search history.

(56) References Cited

U.S. PATENT DOCUMENTS

| | | | | |
|---|---|---|---|---|
| 7,152,791 | B2* | 12/2006 | Chappidi | G06Q 10/08 340/8.1 |
| 8,890,692 | B1* | 11/2014 | Lindblad | G06Q 10/08 340/572.1 |
| 8,991,688 | B1* | 3/2015 | Daboub | G06F 16/9554 235/375 |
| 2009/0040101 | A1* | 2/2009 | Ani | G06Q 10/08 342/357.61 |
| 2012/0242481 | A1* | 9/2012 | Gernandt | G06K 19/0705 340/572.1 |
| 2014/0009291 | A1* | 1/2014 | Requist | G06K 7/10386 340/572.1 |
| 2015/0269570 | A1* | 9/2015 | Phan | G06Q 20/3276 705/71 |
| 2016/0116579 | A1* | 4/2016 | Loftis | G06Q 10/0833 340/10.3 |
| 2016/0152350 | A1* | 6/2016 | Puentes | H05B 33/145 340/10.5 |
| 2017/0004444 | A1* | 1/2017 | Krasko | G06Q 10/0833 |

OTHER PUBLICATIONS

International Search Report & Written Opinion issued in International Application No. PCT/GB2020/051486, mailed Sep. 16, 2020; 11 pages.

* cited by examiner

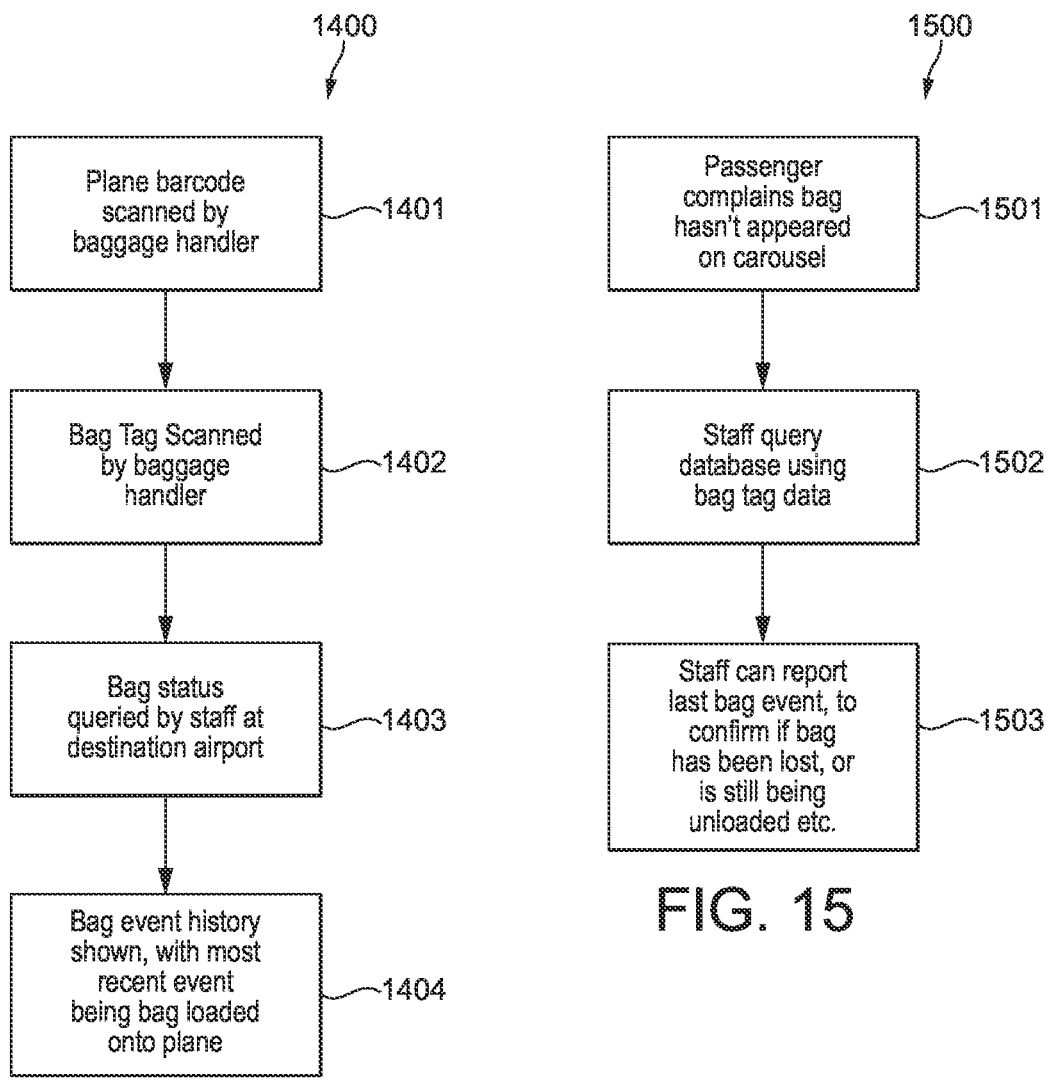

ARTICLE HANDLING SYSTEM AND METHOD

CROSS REFERENCE TO RELATED APPLICATIONS

This application is a national phase application of, and claims benefit of and priority to International Application No. PCT/GB2020/051486, filed Jun. 19, 2020, entitled "ARTICLE HANDLING SYSTEM AND METHOD," which claims priority to European Application No. 19215018.3, filed Dec. 10, 2019, entitled "ARTICLE HANDLING SYSTEM AND METHOD," and Great Britain Application No. 1908848.3, filed Jun. 20, 2019 entitled "ARTICLE HANDLING SYSTEM AND METHOD," the disclosures of which are incorporated by reference as if set forth herein in their entireties.

FIELD OF INVENTION

This invention relates to article handling systems and methods.

BACKGROUND TO THE INVENTION

The airline industry has strict regulations which require the effective handling (i.e. tracking and management) of baggage. Current bag handling systems use the Baggage Information Message (BIM) data format to track an article of baggage during a journey. Complex and expensive computer systems and networks use laser-scanned 1$d$ barcode paper tags to generate and send BIM messages to back-end baggage handling systems as the bag makes its way through its journey. All of this is done to ensure that a bag is properly routed through an airport sortation system, placed in a proper container, loaded on the correct aircraft, and eventually deposited on the correct carousel at the correct destination airport.

Although these systems have provided excellent success rates of baggage delivery, such systems are complex and expensive to purchase and operate. This has resulted in baggage tracking only being available in large airports, or via expensive proprietary solutions for specific airlines. Additionally, BIM messages are teletype based, cryptic in content, inflexible and require a minimum level of information per message that is obtained through integration with additional complex systems.

For these reasons, only larger airports, with a high volume of passengers per year and an established airline customer base, tend to have the resources for the most comprehensive tracking coverage. Conversely, smaller airports have limited infrastructure for providing the required level of automated baggage handling and baggage tracking.

Being unable to track a bag throughout a journey results in "holes" in the baggage tracking ecosystem. This makes it more difficult to manage irregular baggage situations and can cause airlines to lose revenue due to the cost of locating and repatriating lost bags, as well as creating negative relationships between passengers and airlines, and between airlines and airports.

Further to the above, the air transport industry (ATI) is seeking to move away from traditional paper bag tags as a means of tracking baggage, as paper tags are easily damaged or lost. Accordingly alternative solutions, such as radiofrequency identifier (RFID) bag tags, are being introduced which are more efficient and more robust.

However, as the industry as a whole transitions from legacy systems to newer systems, individual airports will operate with different operational capabilities. This can lead to the problem of being unable to identify baggage at locations with lower operational capabilities due to the incompatibility of the different systems. Thus, an environment is needed whereby legacy systems, which use paper-based barcode bag tags, can co-exist alongside and co-operate with newer systems.

The invention aims to address and ameliorate the problems discussed above.

SUMMARY OF THE INVENTION

The invention is defined by the independent claims, to which attention is now drawn. Preferred features are laid out in the dependent claims.

A first aspect of the invention relates to an article handling system comprising one or more article tags associated with an article, the one or more article tags configured to provide a first article identifier associated with the article and a second article identifier associated with one of the article tags. The system further comprises a mobile device having scanning means for scanning the one or more article tags to obtain the first and second article identifiers, and a mobile application stored on the mobile device. The mobile application is configured to generate a message comprising a first message line including the first article identifier, and a second message line including the second article identifier. The mobile application is further configured to send the message to a location whereby the article may subsequently be identified at the location using either or both of the first and second article identifiers.

Embodiments according to the first aspect of the invention advantageously reduce the occurrence of mishandling of articles by the article handling system while cooperating with legacy systems.

In one embodiment, at least one of the one or more article tags is an electronic radiofrequency article tag. This advantageously removes the need for a direct "line of sight" to read data from the electronic article tag and provides better readability of the data from the article tag. Further, electronic article tags are less susceptible to damage and store additional data compared to conventional paper tags.

In another embodiment, the at least one electronic radiofrequency article tag includes a memory chip storing a tag identifier (TID) that uniquely identifies the tag. This advantageously enables the article tag to be uniquely identified using the TID.

In another embodiment, the TID comprises a hexadecimal code. This advantageously enables the TID to be a unique character-string while limiting the number of characters in the character-string.

In another embodiment, the at least one electronic radiofrequency article tag is a passive type or an active type. In further embodiments, the at least one electronic radiofrequency article tag is a permanent type or a temporary type.

In another embodiment, the second article identifier is readable optically or electronically. This advantageously enables the system to successfully read the second article identifier in numerous ways, thereby ensuring the system is more efficient and reliable.

In another embodiments, the second article identifier is different to the first article identifier. This advantageously enables the system to identify the article in a number of different ways, thereby providing greater flexibility and reliability.

In further embodiments, the message further comprises a third message line including a location identifier for providing location information related to the current location of the article. This advantageously enables the system to track the historical location of the article.

In another embodiment, the first article identifier is a baggage licence plate number. In another embodiment, the second article identifier is one or more of a tag identifier (TID), a universally unique identifier (UUID), a globally unique identifier (GUID), a Bluetooth Low Energy universally unique identifier (BLE UUID), or passenger related information. In further embodiments, the location is an origin airport, a transfer airport or an arrival or destination airport.

In another embodiment, the message is a baggage information message (BIM). In further embodiments, the first message line is defined by the .N element of the BIM. In further embodiments, the second message line is defined by the .M element of the BIM. Advantageously, this enables the system to cooperate with existing systems used throughout the Air Transport Industry.

In another embodiment, the .M element includes a plurality of rows each of the rows being associated with a different article identifier. This advantageously enables the same article to be identified using any of a number of different article identifiers.

In a further embodiment, the message is sent to BIM processing systems at the location.

A second aspect of the invention relates to an article handling method comprising associating one or more article tags with an article, the one or more article tags providing a first article identifier associated with the article and a second article identifier associated with one of the article tags. The method further comprises obtaining the one or more article identifiers at a mobile device having scanning means by scanning, with the mobile device, the one or more article tags. The method further comprises generating, with a mobile application stored on the mobile device, a message comprising a first message line including the first article identifier, and a second message line including the second article identifier. The method further comprises sending the message to a location, whereby the article may subsequently be identified at the location using either or both of the first and second article identifiers.

Advantages associated with the second aspect of the invention are the same as those described above relating to the first aspect of the invention.

A third aspect of the invention relates to a computer program product which when executed performs the steps of the method according to the second aspect of the invention.

Advantages associated with the third aspect of the invention are the same as those described above relating to the first and second aspects of the invention.

Embodiments of the invention should preferably satisfy the tracking, sorting and reconciliation requirements of the ATI. Additionally, embodiments of the invention preferably have the advantage of being expandable and cost effective in order to effectively cover the whole journey made by a bag, which may include travel destinations outside of an airport, for example hotels, and car rental locations.

DETAILED DESCRIPTION

Embodiments of the invention will now be described, by way of example only, with reference to the accompanying drawings, in which:

FIG. 14 shows a first schematic flow diagram for a user obtaining tracking history of an article; and FIG. 15 shows a second schematic flow diagram for a user obtaining tracking history of an article.

Figure 1:
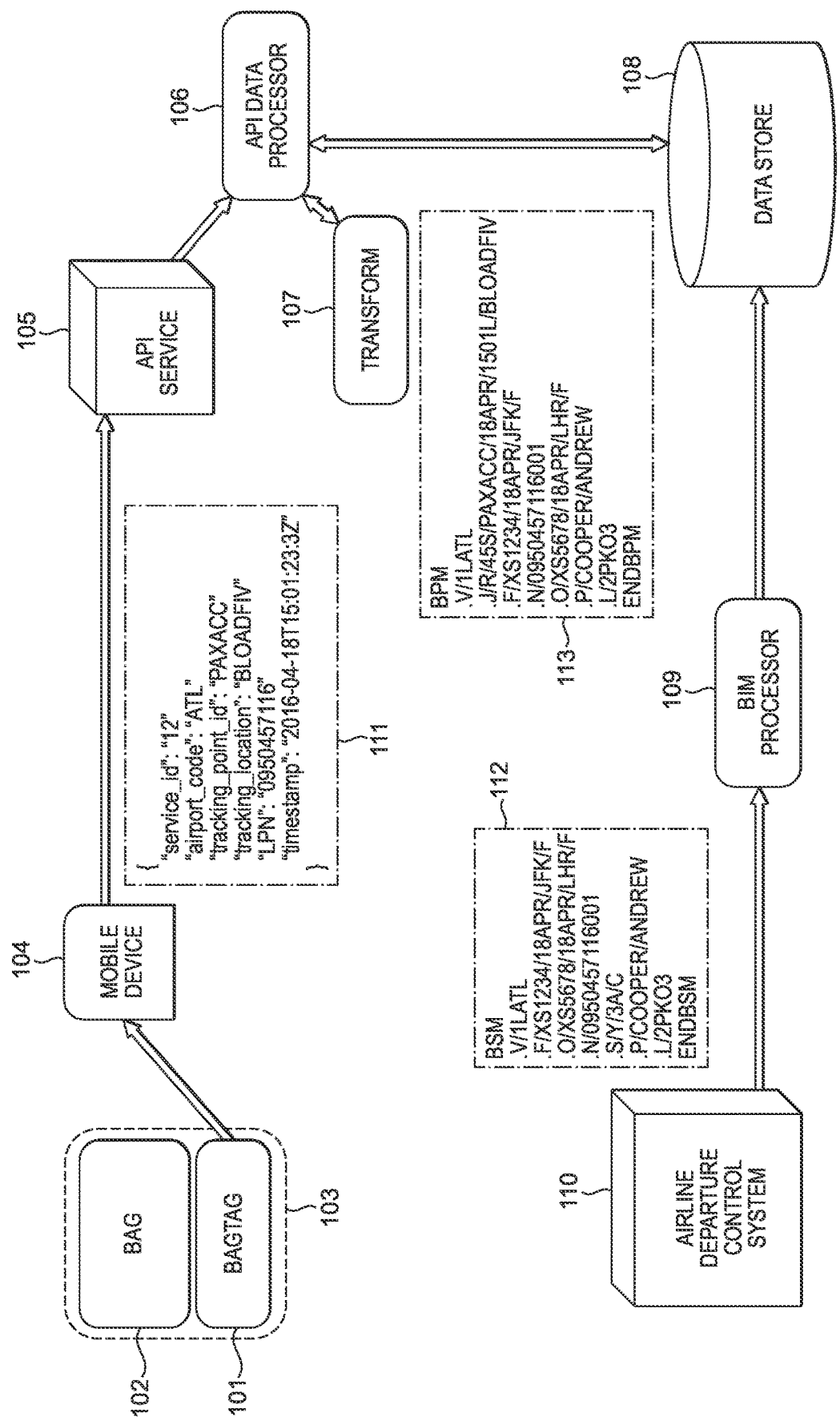
FIG. 1 shows a schematic diagram of a mobile tracking system embodying the invention.

Embodiments of the invention described below relate to baggage handling and baggage tracking within the airline and other transportation industries. However, the invention is related generally to tracking an article in any large venue, including, but not limited to, shopping centres, sports stadia, commercial premises, academic institutions and performance venues.

Presently, bags are tracked in the airline industry using 1-d laser barcode scanners and Baggage Information Messages (BIMs), which are sent between departure control systems and automated baggage handling systems. The BIMs are sent, received and processed by the airport departure and baggage handling systems in order to achieve automated baggage sortation, passenger and baggage reconciliation, and other baggage services.

Bag information included in the BIMs is linked with a 10-digit bag tag number defined as the Licence Plate Number (LPN). This 10 digit LPN is issued during check-in and is used to create a unique reference to a specific bag which is used as a principal means of identifying the bag by the baggage handling system. The airport systems receive this 10 digit LPN in a baggage message and store the LPN for use as a reference when communicating to other airport systems. The LPN is represented on the 1-d laser barcode issued for a checked bag.

There are several different types of Baggage Information Messages, including Baggage Source Messages (BSMs) and Baggage Processed Messages (BPMs).

The BSM provides information for processing baggage by automated baggage systems. For example, a BSM will be generated by an airline Departure Control System when a passenger checks in a bag for a journey, when a bag must be transferred to a different flight, and when a bag has been mishandled.

An example of a BSM in teletype format is shown below. Data contained within the BSM may be sourced from baggage handling systems, or other systems storing passenger information.

| MESSAGE CODE LINE | MESSAGE LINE DESCRIPTION |
|---|---|
| BSM<= | Standard Message Identifier |
| .V/1LZRH<= | Version 1; Local baggage at Zurich Airport (ZRH) |
| .F/BA101/18APR/JFK/F<= | Outbound carrier and flight; Date; Destination; Class |
| .N/0125123456003<= | LPN-IATA airline code; Baggage number (underlined); Number of consecutive tags |
| ENDBSM<= | End of Message Identifier |

In the above example the second line, which begins .V, defines the current location of the bag, Zurich, and indicates the bag has originated there.

The third line, which begins .F, defines the itinerary. In this case, a bag has been checked onto British Airways flight number BA101 to JFK International Airport on 18 April and belongs to a first class passenger. Itinerary data is mandatory in BSMs for originating baggage, as in the above example, and transfer baggage. It is not included for a bag which has reached its terminating location.

In the fourth line, .N indicates the baggage LPN and the number of checked in bags belonging to the same traveller. The 1st digit is a leading digit which may be used by individual airlines to aid baggage identification. The 2nd to 4th digits (085) define a 3-digit IATA airline code. For example, 006 indicates Delta Airlines and 125, the example here, indicates British Airways. The 5th to 10th digits (underlined above) define a 6-digit baggage number associated with the bag at check-in. The final 3 digits indicate that 3 bags were checked in by the passenger. Thus, 3 LPNs are associated with this passenger:

LPN #1=0125123456
LPN #2=0125123457
LPN #3=0125123458.

The 6-digit baggage numbers are generated in sequential order and combined with a 3-digit IATA airline code and a customisable leading digit to create an LPN. Due to the large volume of passengers, airlines must reuse existing LPNs, and so a bag is uniquely identified by combining the date of travel with the ten digit LPN. Thus the LPN combined with the date of travel is an example of a unique baggage identity which is encoded in a bag tag which is an example of an article identifier.

BSMs are sent to provide information for processing of baggage by automated baggage systems. For example, a BSM may be sent when a bag tag is deleted, a bag is re-routed or a passenger's itinerary is changed.

BPMs are sent to communicate when a bag has been processed by a baggage handling system. For example, a BPM may be sent when the baggage handling system reports that a bag has missed a connection. BPMs come in two varieties: sortation messages and reconciliation messages. As before with BSMs, the data contained within a BPM may be sourced from baggage handling systems, or other systems storing passenger information.

BPM sortation messages are sent during various stages of the bag journey and enable baggage sortation systems to determine whether a bag has been correctly sorted. The sortation messages also include screening messages. Baggage screening systems are used by Transport Security Agents (TSAs) to check baggage, and a BPM is generated if the bag is approved.

BPM reconciliation messages are confirmation messages sent when a bag successfully completes part of the bag journey. For example, a BPM reconciliation message may be sent when a bag is correctly loaded onto or unloaded from an aircraft.

Embodiments of the invention provide an article scanning and identification system using a multi-protocol API connected to a cloud platform via a network. Where the article is an item of baggage, the system can be used for remote baggage tracking, as further described below.

As shown in FIG. 1, a system 100 embodying the invention includes: a bag tag 101 associated with a bag 102 to form a tracked article 103; a mobile device 104; a cloud platform comprising an API Service 105, an API Data Processor 106, a Transform service 107, a Data Store 108, and a Baggage Information Message (BIM) Processor 109; and an Airline Departure Control System (DCS) 110. The mobile device 104 includes a mobile application for communicating with the API service.

During the check in process, the Airline DCS 110 sends messages 112 including passenger-related information to the BIM processor 109 and for storing in a data store as a passenger name record (PNR). Embodiments of the invention enable bag location information to be amalgamated with existing PNR data by sending messages 111 including bag location information from the mobile device 104 to the cloud platform via the API service 105, as further described below. A message 113 is generated including tracking information and passenger-related information and stored in data store 108. Providing the functionality of the API on a mobile application allows an airport to provide bag scanning and tracking functionality using a mobile device, thereby reducing the costs and infrastructure requirements for tracking a bag.

When a bag 102 is checked in, the airline generates a paper bag tag 101 which includes a licence plate number (LPN) associated with the baggage article. The check-in event generates a Baggage Source Message (BSM) in the airline's Departure Control System (DCS) 110. An example BSM 112 (Message 1) shown in FIG. 1 is detailed below.

| Message 1 |
|---|
| BSM |
| .V/1LATL |
| .F/XS1234/18APR/JFK/F |
| .O/XS5678/18APR/LHR/F |
| .N/0950457116001 |
| .S/Y/3A/C |
| .P/COOPER/ANDREW |
| .L/2PKO3 |
| ENDBSM |

In the above example, the BSM 112 provides the following passenger-related information and instructions for ground handlers.

".V/1LATL" provides version information, including the source of the baggage article and the airport the BSM was generated at. In this example, the BSM 112 was generated at Atlanta airport and the bag 102 is local, i.e. it has not been transferred from elsewhere.

".F/XS1234/18APR/JFK/F" provides flight information, including flight number, the date of the flight, the destination airport and seat class. In this example, the bag 102 is associated with a passenger travelling on flight XS1234 on 18 April to John F. Kennedy International Airport with a First Class seat.

".O/XS5678/18APR/LHR/F" provides information relating to any onward or connecting flights, including the onward flight number, onward flight date, destination and seat class. In this example, the bag 102 needs to be loaded onto connecting flight XS5678 on 18 April to London Heathrow Airport.

".N/0950457116001" provides the bag tag information, which includes a 10 digit LPN and the number of articles checked in by the same passenger. In this example, the LPN is 0950457116 and only one bag 102 was checked in by the passenger.

".S/Y/3A/C" provides baggage reconciliation information, including whether a bag 102 is authorised to be loaded, the passenger's seat number and the passenger's status. In this example, the bag is authorised to be loaded onto the plane, the passenger has checked in and will be seated in seat 3A.

".P/COOPER/ANDREW" provides passenger name information.

Finally, ".L/2PKO3" provides passenger name record (PNR) address information.

The BSM 112 containing the above information is sent to the cloud platform via message routers from the Airline DCS 110 and is processed by a BIM Processor 109. The BIM processor 109 stores the baggage event in the cloud Data Store 108. Accordingly, the Data Store 108 contains a record of the information provided by the BSM 112.

The mobile device 104 has scanning means for scanning the bag optically and/or by RF (Radio Frequency) means. Accordingly, after check-in, the bag tag 101 associated with the bag 102 may be scanned by the mobile device 104 at various scan locations. Scanning the bag tag associated with a bag enables information to be sent to the cloud platform API service 105 via a message 111, which in preferred embodiments is an API payload, as shown in FIG. 1. The message is then converted into a corresponding BIM 113 by Transform service 107 to enable compatibility with legacy systems. In preferred embodiments the mobile device sends information as a BIM rather than an API payload (not shown in FIG. 1). In some embodiments, the scan locations define points of interest on a bag journey. For example, a point of interest on a bag journey may be a plane-side loading point where baggage is stored before being loaded onto an aircraft. Scanning the bag tag 101 with the mobile device 104 retrieves an article identifier such as an LPN associated with the bag 102 from the bag tag 101. In preferred embodiments, the mobile application generates a message 111 including article information related to the bag and location information related to the current location of the bag and sends the message to the API service 105 via the network. Alternatively, the message 111 may be delivered to the API service 105 via WIFI, 3G, LTE or any other wireless connectivity means.

In embodiments further to the above, electronic bag tags may be used as an alternative to issuing paper bag tags 101.

Some electronic bag tags may make use of radiofrequency (RF) technology to identify a bag. Such electronic RF bag tags may be "active" or "passive". Examples of "active" electronic bag tags include Bluetooth beacons that continuously emit a Bluetooth Low Energy (BLE) packet. By contrast "passive" bag tags, such as radiofrequency devices that enable radiofrequency identification (RFID), only transmit a signal when stimulated by a reading device. Additionally, electronic bag tags may be single use ("temporary") or multi-use ("permanent"). Additionally, e-ink displays can be used as permanent bag tags that display the same barcode as a traditional paper tag but can be refreshed with updated barcodes such that the same bag tag can be used for multiple journeys.

In preferred embodiments, electronic bag tags are associated with a unique tag identifier (TID) written to a memory chip in the electronic bag tag during manufacture such that the TID cannot be subsequently changed. In preferred embodiments, the TID is represented so that it may be identified using different detection techniques. For example, the TID may be represented as a 2d barcode so that the TID may either be identified optically or be identified via a radiofrequency signal emitted by the bag tag so that the TID may also be identified electronically.

The use of electronic bag tags is advantageous over traditional paper bag tags which, as indicated above, are printed with a 10-digit license plate number (LPN) encoded in a 1D barcode. This is because electronic bag tags can provide better readability of the data and there is no need for a direct "line of sight" to read data from the electronic bag tag, as opposed to optically scanning a barcode. Additionally, electronic bag tags are less susceptible to damage than paper bag tags and are also able to store additional data further to the TID.

Further to the above, and as already indicated, legacy systems rely upon LPNs to identify a particular bag. However, as LPNs include relatively few digits and as passenger numbers increase, LPNs are recycled frequently—usually after a few days or even sooner. It is therefore possible for multiple bags to be issued with the same LPN, resulting in the mishandling of bags. In 2018, 24.8 million bags were mishandled, of which approximately 1 million bags (4%) were mishandled due to tagging errors. The use of an alternative identifier, such as a TID, to uniquely identify a bag ameliorates this problem.

Although moving away from the use of LPNs to track baggage is desirable, it is difficult to achieve while ensuring backward compatibility with legacy systems that rely upon the use of LPNs. At present, existing baggage handling systems and baggage tracking systems are set up to use LPNs as a main identification means. However, while this remains the case, a mixed system using electronic bag tags having TIDs and paper bag tags having LPNs cannot migrate away from a reliance upon LPNs and so still suffers from the problems associated with LPNs, as discussed above.

As described above, at present a bag identifier (i.e. an LPN) is communicated by the BSM within a specific baggage message data element, ".N". Because the LPN is used as the primary means of uniquely identifying a bag, the inclusion of an LPN in the .N element is mandatory for a number of different baggage handling messages, such as Baggage Sortation Messages (BSMs), Baggage Transfer Messages (BTMs) and Baggage Processing Messages (BPMs). To ensure that the tracking of bags is achieved effectively and efficiently, the value of .N is non-variable, meaning that no other bag identifiers are provided in the .N element.

By contrast, in embodiments according to the claimed invention, a modified BSM may be used to communicate a first article identifier and a second article identifier that are used to subsequently identify and track the bag.

The article identifier may be any suitable means for uniquely identifying a bag. For example, the article identifier may be an LPN, a TID, a UUID (universally unique identifier) or GUID (globally unique identifier), passenger related information, or a combination thereof. The passenger related information may include the flight details of the one or more journeys that the bag is scheduled to take, and personal details of the passenger who checked the bag. For example, the flight details may include the flight number and date of flight, and the passenger's details may include a first name and a surname.

There a number of different types of bag tag presently in use by the ATI. These include, but are not limited to: paper bag tags and electronic bag tags. In some embodiments the bag tags are single-use and intended for only a single journey. In alternative embodiments, the bag tags are multi-use (so-called "permanent bag tags") and intended to be reused for multiple journeys.

Paper bag tags traditionally used by the ATI include a printed barcode, which may be a 1d barcode or a QR code, that is optically read by one or more optical scanners. The printed barcode includes an LPN associated with the bag at check in. Accordingly, scanning the printed barcode enables the LPN to be retrieved thereby identifying the bag. Traditional paper bag tags are only valid for a single use and a new bag tag must be provided for subsequent journeys.

Electronic bag tags may include RFID inlays, Bluetooth Low Energy beacons, Near Field Communication (NFC) inlays or e-ink technologies.

In some embodiments, e-ink bag tags use an e-ink display screen to display a barcode in an energy-efficient manner. Accordingly, the display screen is able to display different barcodes for different journeys such that the bag tag is valid for multiple uses. In such embodiments, the e-ink bag tags display either a 1D barcode, or a TID to enable a particular permanent bag tag to be uniquely identified, which is displayed as a 2D barcode (such as a QR code) so that the TID may be read optically.

In alternative embodiments, RFID inlay bag tags include an RFID-chip (inlay) that stores data in a local memory and produces a low-energy signal when interrogated by a scanner. The emitted signal may include the stored data, which in preferred embodiments relates to data associated with the bag tag and the bag associated with the bag tag. All RFID inlay bag tags include a unique TID which may also be included in the emitted RFID signal, as further detailed below.

There are numerous ways of using RFID bag tags, each of which corresponds to the amount of data communicated by the RFID signals emitted by the bag tags.

Firstly, RFID bag tags may include only an RFID inlay. In preferred embodiments, the RFID signal emitted by the inlay-only RFID bag tag includes a pre-encoded application family identifier (AFI) and the TID. The TID is the serial number of the RFID-chip that is provided by the manufacturer. The AFI is an internationally standardised method for classifying RFIDs by their application. This enables a single communications protocol to be used across several different applications. Accordingly, in preferred embodiments the AFI positively indicates that the RFID signal originates from a bag tag.

Secondly, RFID bag tags may include an associated inlay. For associated-inlay RFID bag tags, the unique TID is associated with the LPN issued at check in. In some embodiments, a barcode including the associated LPN is printed on the associated-inlay RFID bag tag but not included in the RFID chip memory. Thus, optical scanners may retrieve the associated LPN from the bag tag and an RF scanner may retrieve the TID from the bag tag.

Thirdly, RFID bag tags may include a basic encoding inlay. Basic encoding inlay RFID bag tags are similar to associated-inlay RFID bag tags, but the LPN and date of departure are encoded into the RFID chip memory, usually during the check-in process. Thus, both optical and RF scanners may retrieve both the TID and the associated LPN from the bag tag. The use of basic encoding inlay RFID bag tags is therefore advantageous as it enables a bag to be identified using either the TID or the LPN. However, additional information may be required in order to successfully process and handle a particular bag by identifying flight-related information associated with the TID and/or the LPN.

Finally, RFID bag tags may include a rich encoding inlay. Rich encoding inlay RFID bag tags are similar to basic encoding inlay RFID bag tags, but the RFID memory also includes a user memory field to enable a user to encode the field with additional user-defined information. In preferred embodiments, user-defined information may include flight-related information, such as one or more flight numbers and departure dates. In addition, the user-defined information may include passenger related data such as a passenger name record (PNR), priority status and frequent flier number.

In addition to the above, in some embodiments bag tags may use BLE beacons to emit a BLE UUID. The BLE UUID may be used equivalently as the TID as described above.

As described above for LPNs, a TID can be included in the message sent by the mobile application (not shown in FIG. 1) and communicated to other baggage handling systems and departure control systems. As described above, the TID can then be communicated to other systems via standard baggage messages, such as BPMs. However, the TID is communicated such that it is located on a separate messaging data element, such as a ".M" element (not shown in FIG. 1), as further described below.

In preferred embodiments, the TID can be used to identify a bag instead of, or in addition to, an LPN. Further to the description above relating to the use of LPNs, baggage information messages (BIMs) can include a TID as an article identifier, as detailed further below. The TID usually comprises 24 hexadecimal characters. For example, an electronic bag tag may be manufactured with the following TID:

C9 6B 68 CE AC 21 93 7F DF DD C2 BA

Accordingly, a corresponding example BIM that includes the TID is as follows:

| Message 2 |
| --- |
| BIM<br>.V/1LATL<br>.F/XS1234/18APR/JFK/F<br>.O/XS5678/18APR/LHR/F<br>.N/0950457116001<br>.M/0950457116001/T/C96B68CEAC21937FDFDDC2BA/001<br>.S/Y/3A/C<br>.P/COOPER/ANDREW<br>.L/2PKO3<br>ENDBIM |

Message 2 is similar to Message 1, which included the LPN in the .N element. However, Message 2 includes a new ".M" element containing the LPN ("0950457116001") an ID type ("T" which indicates that the article identifier is a TID), the TID ("C96B68CEAC21937FDFDDC2BA") and a link ("001").

It will be understood from the above that Message 2 is generated for bag tags having an RFID inlay that is being handled by an airport having the technological capability to read the RFID inlay.

In alternative embodiments using bag tags including BLE inlays, the system that reads and detects the electronic bag tag creates a standardised universally unique identifier (UUID) based on the TID and includes the UUID in the BIM as an article identifier rather than the TID. This is advantageous as UUIDs are standardised and so can be recognised and used by standard computing systems.

The UUID is usually created by including in the TID a reference character that indicates the UUID version, a further reference character that indicates the UUID variant, and a characteristic six-character sequence.

For example, the TID indicated above may be used to generate the example version 4, variant "a" standardised UUID shown below:

c96b68ce-ac21-4937-afdf-ddc2ba4289ec where the version character ("4") is inserted after the first 12 characters, the variant character ("a") is inserted after the next 3 characters, the characteristic six-character sequence ("4289ec") is inserted at the end, and the UUID is separated into a standardised character string. In the above example, For example, the above TID may be used to generate the UUID below separated into a character string of 8-4-4-4-12 characters.

The UUID may be included in the .M element of the BIM, as shown below in the example below (Message 3).

Message 3

BIM
.V/1LATL
.F/XS1234/18APR/JFK/F
.O/XS5678/18APR/LHR/F
.N/0950457116001
.M/0950457116001/G/ C96B68CEAC214937AFDFDDC2BA4289EC/001
.S/Y/3A/C
.P/COOPER/ANDREW
.L/2PKO3
ENDBIM

In Message 3, the ".M" element contains the LPN ("0950457116001") an ID type ("G" which indicates that the article identifier is a UUID in accordance with the RFC 4122 standard), the UUID ("C96B68CEAC214937AFDFDDC2BA4289EC") and a link ("001").

Similarly for the TID, the use of a UUID allows the baggage handling system to unambiguously identify itinerary data and history for a particular baggage tag. Advantageously, the use of a unique identifier, such as a TID or a UUID does not place any time constraints upon the use, and reuse, of 10-digit LPNs.

In alternative embodiments, a GUID may be encoded to the .M element based on the TID and includes the GUID in the BIM as an article identifier rather than the TID.

The GUID is usually created by splitting the TID into 12-, 3- and 9-character sections, inserting a "4" and an "A" at the split points and appending the sequence "454254" at the end as shown in the example BIM below:

Message 4

BIM
.V/1LATL
.F/XS1234/18APR/JFK/F
.O/XS5678/18APR/LHR/F
.N/0950457116001
.M/0950457116001/X/001/C96B68CEAC214937AFDFDDC2BA454254
.S/Y/3A/C
.P/COOPER/ANDREW
.L/2PKO3
ENDBIM

In Message 4, the ".M" element contains the LPN ("0950457116001"), an ID type ("X" which indicates that the article identifier is a GUID), the GUID ("C96B68CEAC214937AFDFDDC2BA454254") and the bag tag creation Julian ("001").

In alternative embodiments, the LPN may be encoded to the .M element along with both TID and GUID (generated from the TID) associated with the bag tag which are together used as an article identifier, as shown in the example BIM below:

Message 5

BIM
.V/1LATL
.F/XS1234/18APR/JFK/F
.O/XS5678/18APR/LHR/F
.N/0950457116001
.M/0950457116001/T/7D38A21F0B6E54D359C6CF0A/002
.M/0950457116001/X/001/7D38A21F0B6E454DA359C6CF0A454254
.S/Y/3A/C

-continued

Message 5

.P/COOPER/ANDREW
.L/2PKO3
ENDBIM

In the above example Message 5, the ".M" element contains a first row including a first article identifier and a second row including a further article identifier. Thus, there are two .M element rows for the same bag.

The first row of the .M element includes the LPN ("0950457116001"), an ID type ("T" which indicates that the article identifier associated with the first row is a TID), the TID ("7D38A21F0B6E54D359C6CF0A") and a link ("002").

The second row of the .M element includes the same LPN ("0950457116001"), the ID type ("X", which indicates that the article identifier associated with the second row is a GUID), the GUID ("7D38A21F0B6E454DA359-C6CF0A454254"), and the bag tag creation Julian date ("001").

It will be appreciated that in this example the LPN, TID and the GUID are all combined and available as an article identifier.

Finally, in preferred embodiments where legacy systems are still used, the LPN that is read optically is copied for use in the .M element, as indicated in the example BIM below.

| Message 6 |
|---|
| BIM |
| .V/1LATL |
| .F/XS1234/18APR/JFK/F |
| .O/XS5678/18APR/LHR/F |
| .N/0950457116001 |
| .M/0950457116001 |
| .S/Y/3A/C |
| .P/COOPER/ANDREW |
| .L/2PKO3 |
| ENDBIM |

It will be appreciated from the above that Message 6 may be generated in the scenario where a traditional 1d barcode paper bag tag is read at any airport. It will also be appreciated that in this example the LPN is used as the article identifier.

In preferred embodiments, the article information is electronically readable to enable the mobile device to obtain the article identifier. For example, the article identifier may be obtained by scanning a bag tag with an RFID scanner. The article identifier included in the message 111 preferably contains the LPN which functions as a first article identifier. Additionally, the article identifier may also include a TID which functions as a second article identifier for uniquely identifying the article.

Specific advantages associated with the above embodiments include: providing the LPN and the TID/GUID in a BIM without an intervention of the DCS and without a local, or dedicated, connection to the BIM messaging system. This is advantageous as it reduces both development and operational costs due to reducing the amount of processing and computation required by the DCS. In addition, the above embodiments advantageously enable individual airports to read either the .N or .M message lines depending on relative capabilities to identify a bag. This means that a bag can always be identified—regardless of the location, and/or airline DCS capabilities to read or generate .M elements in the BIMs— while retaining the benefits of newer tracking technologies. Finally, the above embodiments enable the crossover from legacy systems to newer systems to be at an individual airport's discretion.

Further to the above, in some embodiments the system may also obtain location information related to the current location of a bag. The location information may be obtained from a location identifier associated with a point of interest on a bag journey using the mobile device. In a specific example, the identifier may be a tracking location barcode placed at a key location during a bag journey which is scanned by the mobile device. For example, a location barcode may be placed next to each arrivals carousel.

An example format of a tracking location barcode is:
AAAEEEEEEEELLLLLLLLLUCT

In the above example, "AAA" is an airport code. "EEEEEEEE" is an 8 character event type, which is passed to the API as "tracking_id." "LLLLLLLLLL" is a 10 character location, which is passed to the API as "tracking_lo-cation." "U" is an instruction for an unknown bag. The instruction may be to ignore the unknown bag or to input flight data. "c" is a container input instruction. In some circumstances, a further barcode reading of a container ID is required after scanning a tracking point. "T" is the type of scan event to be performed. For example, the scan event may be loading or tracking.

In alternative embodiments, the identifier associated with a point of interest may be encoded in a short-range radio signal located at the point of interest.

Enabling the mobile device to scan the bag tag associated with a bag and the identifier associated with a point of interest enables accurate tracking information to be sent to the cloud platform API service 105 via an API payload. The example API payload 111 of FIG. 1 is detailed below.

| |
|---|
| { |
| "service_id": "12" |
| "airport_code": "ATL" |
| "tracking_point_id": "PAXACC" |
| "tracking_location": "BLOADFIV" |
| "LPN": "0950457116" |
| "timestamp": "2016-04-18T15:01:23.3Z" |
| } |

In the above example, "service_id" defines the unique identification number which may be associated with a particular third party such as a customer or contractor. Including "service_id" enables the system to verify that requests or calls to the cloud system are from a known source. "airport_code" defines the airport where the LWBIM was generated. In this example, the airport is identified as Atlanta airport. "tracking_point_id" defines the type of baggage handling event being recorded, and may be associated with a text descriptor. In this example, "PAXACC" may be matched against an internal event code, which indicates that a passenger has accepted the bag at baggage reclaim. "tracking_location" defines the location of where the scan occurred. The tracking location, "BLOADFIV" in this example, may be associated with a location descriptor, "B Load Five" in the present example, or GPS coordinates. "LPN" defines the licence plate number and "timestamp" defines the time that the scan was made. In alternative embodiments, location information could be GPS coordinates provided by a GPS module of the mobile device, or the location information could be manually input by a user.

The API payload 111 including the bag information may be sent to the cloud platform as a lightweight baggage information message (LWBIM). In a specific embodiment, the API payload 111 is a LWBIM in JavaScript Object Notation (JSON) message format, as shown in the example API payload 111 above.

The cloud platform identifies the LPN from the LWBIM 111 and enriches the payload using the API Data Processor 106. In specific embodiments of the invention, the API data processor 106 requests passenger-related information associated with the LPN contained in the LWBIM 111 from the PNR database in Data Store 108. If any passenger-related information is retrieved from the PNR database then the LWBIM is enriched with the passenger-related information by the API Data Processor 106. For example, the cloud platform may retrieve flight information or historical location information from the Data Store 108.

To enable compatibility with legacy systems, the enriched LWBIM is converted into a BIM 113 by Transform service 107. Thus, the BPM contains tracking information received via the API service and passenger-related information via an external system such as the baggage handling system. The cloud platform then processes and stores the BIM 113 as part of a message chain associated with the bag in Data Store 108. This enables the cloud platform to serve requests by parties for the status of the bag at a particular stage during a journey.

Including location information enables the cloud platform to cross-reference the scanned information with information located in a Data Store 108. The LWBIM 111 may then be augmented with additional related information retrieved from the Data Store 108. In some embodiments, the retrieved additional related information includes stored physical location data associated with this location for reporting within the mobile application.

As mentioned above, legacy Airline Systems typically use teletype format messages. If compatibility with legacy systems is required, the LWBIMs, which may be in JSON format, must be converted into a BIM in teletype format as further described below.

First, the API Service 105 accepts the LWBIM message 111 and sends it to the API Data Processor 106. Secondly, the API Processor 106 retrieves information associated with the baggage article 102, including flight information, from the Data Store 108. This is done by using the LPN information included in the LWBIM 111. The API Processor 106 enriches the LWBIM 111 with the data returned from the Data Store 108 and sends the enriched event to the Transform service 107. In a final step, the Transform service 107 transforms the JSON format LWBIM 111 into a teletype BPM 113. Thus, the BPM 113 generated by the Transform service 107 is compatible with external legacy systems and includes baggage location data and passenger information data. The BPM 113 is returned to the API Data Processor 106 and sent to the Data Store 108 to be stored as a new baggage event. BPMs are industry-standard messages which are used by numerous legacy airline systems, such as departure control systems and automated baggage handling systems. Generating a BPM including article location information therefore enables embodiments of the invention to provide article tracking data to existing legacy systems or other third parties.

The example BPM 113 generated by the Transform service of FIG. 1 is detailed below.

```
                    BPM
                   .V/1LATL
        .J/R/45S/PAXACC/18APR/1501L/BLOADFIV
                .F/XS1234/18APR/JFK/F
                    .U/AKE67890LH
                    .N/0950457116001
                    .M/0950457116001
                .O/XS5678/18APR/LHR/F
                    .P/COOPER/ANDREW
                        .L/2PKO3
                        ENDBPM
```

The API data processor matches the LPN provided by the LWBIM 111 with the LPN associated with known passenger-related data detailed in the BSM 112 sent by the baggage handling system. The Transform service 107 is therefore able to include incoming and onwards flights details, if such details exist, into the BPM. The .J element includes tracking data gathered by the mobile application and sent via the LWBIM 111, such as "tracking_id" and "tracking_location." The BPM 113 may also include a container identifier, if such data has been collected, in the 0.0 element (not shown in FIG. 1). In the above example, the container is identified as "AKE 67890 LH".

In some instances, the API Data Processor 106 is unable to retrieve passenger related data from the data store 108 as there is no BSM associated with the particular LPN. This situation may occur if a particular airline has a problem with their network, or if smaller airports do not have access to the baggage handling systems. If passenger related data cannot be retrieved, then the mobile application will issue a prompt for the passenger related data, such as flight number and date of travel, to be entered manually as further described below.

Once written to the Data Store 108, the well-known concept of shadowing may be used to accumulate all the tracking data associated with a bag 102.

A 'shadow' is a software copy of the physical bag tag containing a store of all historical data associated with the bag tag. The shadow may be stored in a cloud-based database and persists even if the system software crashes. The shadow can be replicated for use across different operating systems or hubs. The shadow may be queried to identify a particular bag tag and can return any historical data concerning the baggage article associated with that bag tag, including the most recent location data and LPN.

The shadow therefore contains a full history of the bag's tracked location. A location tracking system could therefore interrogate the shadow, extract the stored tracking data associated with a bag and present the data to a user in a meaningful way.

In an embodiment, the mobile application may send a notification to a passenger when a bag arrives at a specific location. For example, a notification may be sent when the bag arrives at a holding area to await being loaded onto an aircraft. The notification may include information relating to the bag's location and the time of arrival at that location. The notification may also include other information such as passenger details, the flight number and final destination.

Further aspects of the invention may be embodied in a mobile application for use in the above described system. Embodiments of the invention enable the mobile application to create API payloads 111 including bag information and send the API payloads 111 to cloud platform API service 105. Embodiments of the invention also enable the mobile application to query the cloud platform about a bag's location history. In preferred embodiments, the mobile application is loaded onto a mobile device 104 having a scanning module and, in specific embodiments, the scanning module is a camera.

FIGS. 2 to 14 show an example graphical user interface (GUI) for a mobile application which may record and retrieve baggage tracking information.

Figure 2:
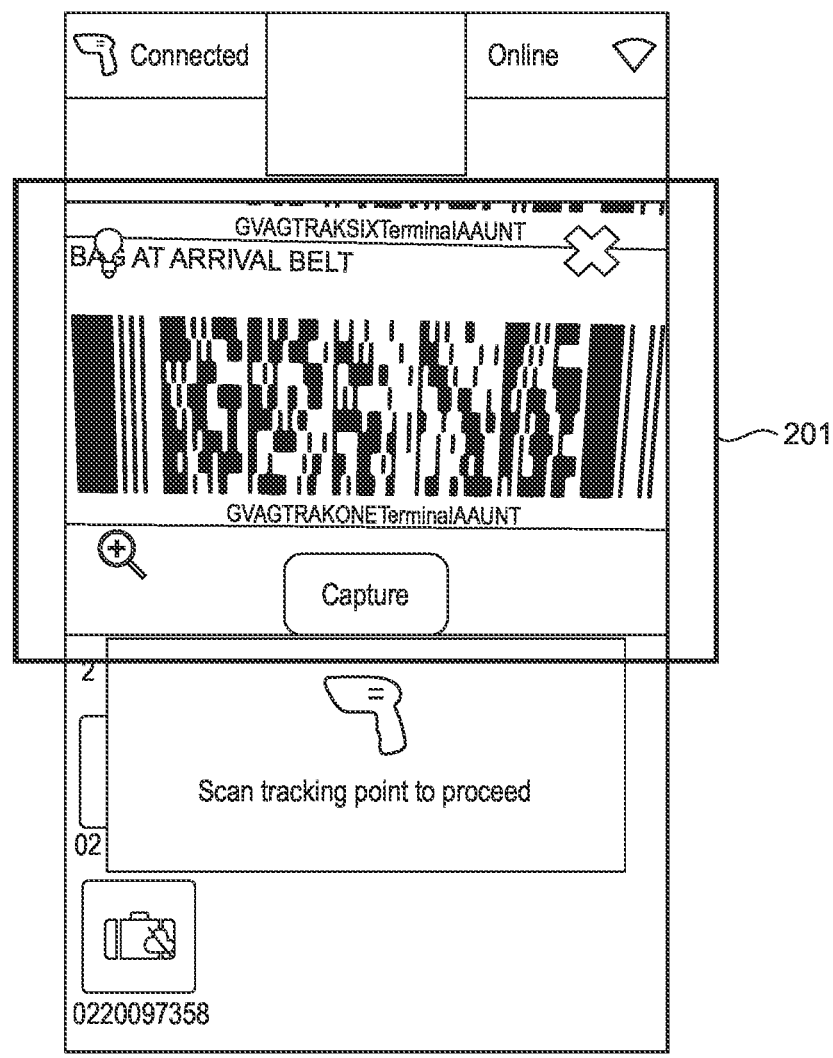
FIG. 2 shows an example graphical user interface (GUI) displaying a location barcode preview.
Figure 3:
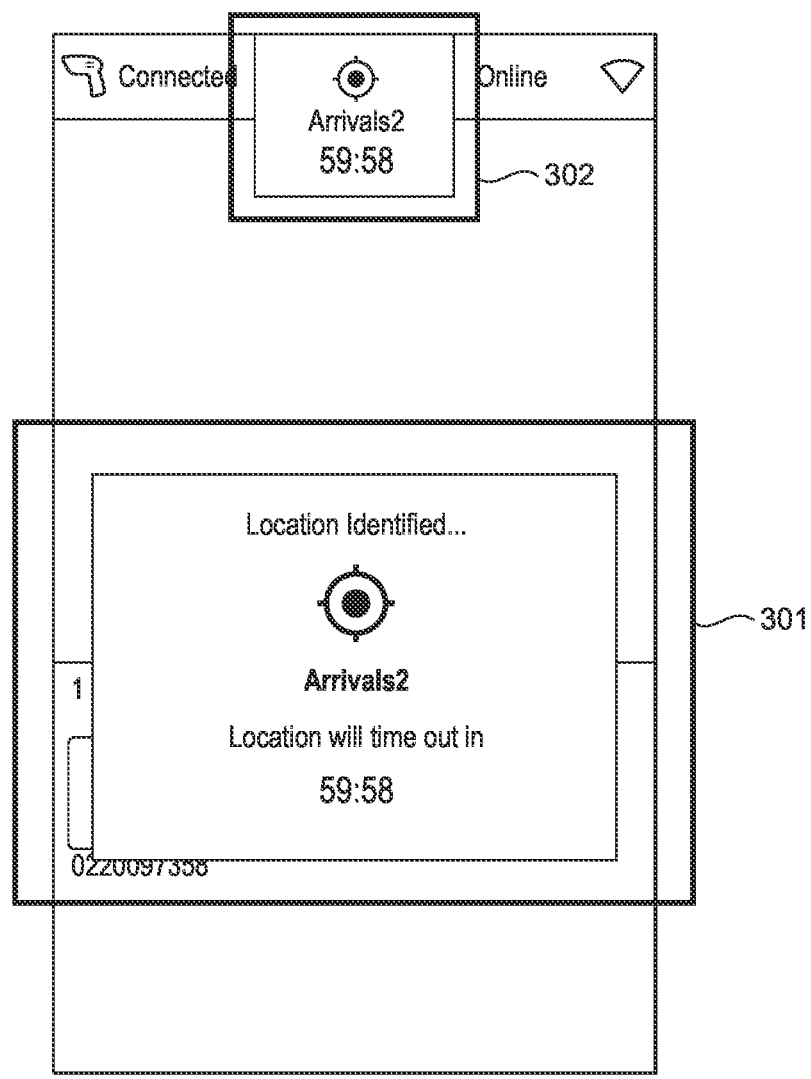
FIG. 3 shows an example GUI displaying a location notification.
Figure 4:
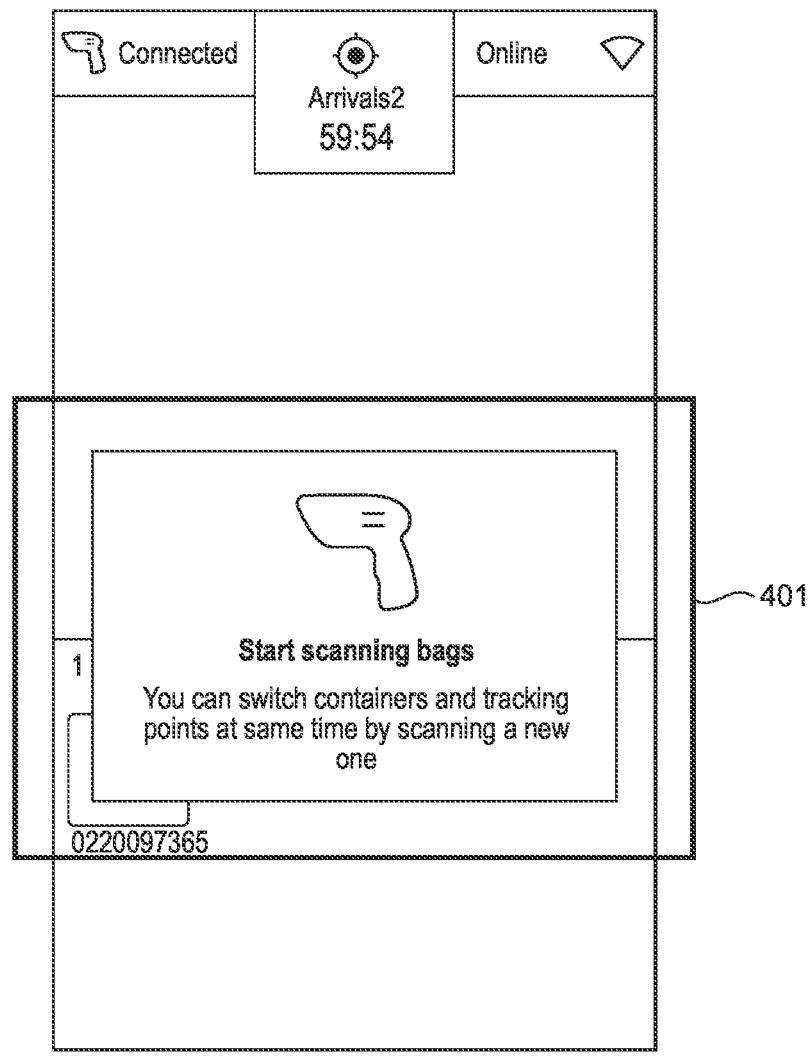
FIG. 4 shows an example GUI displaying a notification that a user may begin obtaining article information by scanning an article identifier.

To record bag location data, the mobile application prompts a user to enter a location. In some embodiments, the bag location may be entered by scanning a tracking point identifier, as shown in FIG. 2. In this case, the GUI displays a preview of the tracking point identifier, as viewed by the scanning module, to enable a user of the mobile application to successfully scan the tracking point identifier.

In the embodiment shown in FIG. 2, the tracking point identifier is a 3 dimensional barcode 201. However, in alternative embodiments, the location information may be provided by any other suitable means, for example receiving a payload from a Bluetooth® beacon, scanning an RFID, or obtaining the current GPS coordinates of the mobile device.

Scanning the tracking point identifier provides the mobile application with location information for associating with a bag to be scanned. If the mobile device successfully identifies the current location, a notification 301 may be displayed by the GUI. In the example shown in FIG. 3, the GUI identifies the current location as arrivals belt "Arrivals2."

Displaying text descriptor of the current location may enable a user to quickly identify whether the scanned location correctly corresponds to their current location. The text descriptor may also be used as a placeholder for more detailed location information, such as GPS coordinates, by the cloud platform.

Once identified, the location information is valid for a limited period of time. In the example shown in FIG. 3, the location information is valid for approximately one hour. Any bag that is scanned within this time period will be associated with the current location, "Arrivals2." The GUI displays an indicia 302 indicating the current location and the time remaining before the location information needs to be updated. Validating the location information for a limited period of time beneficially prevents a user from continually re-entering location information, while also preventing the application from retaining old location data, which may no longer be accurate.

Figure 5:
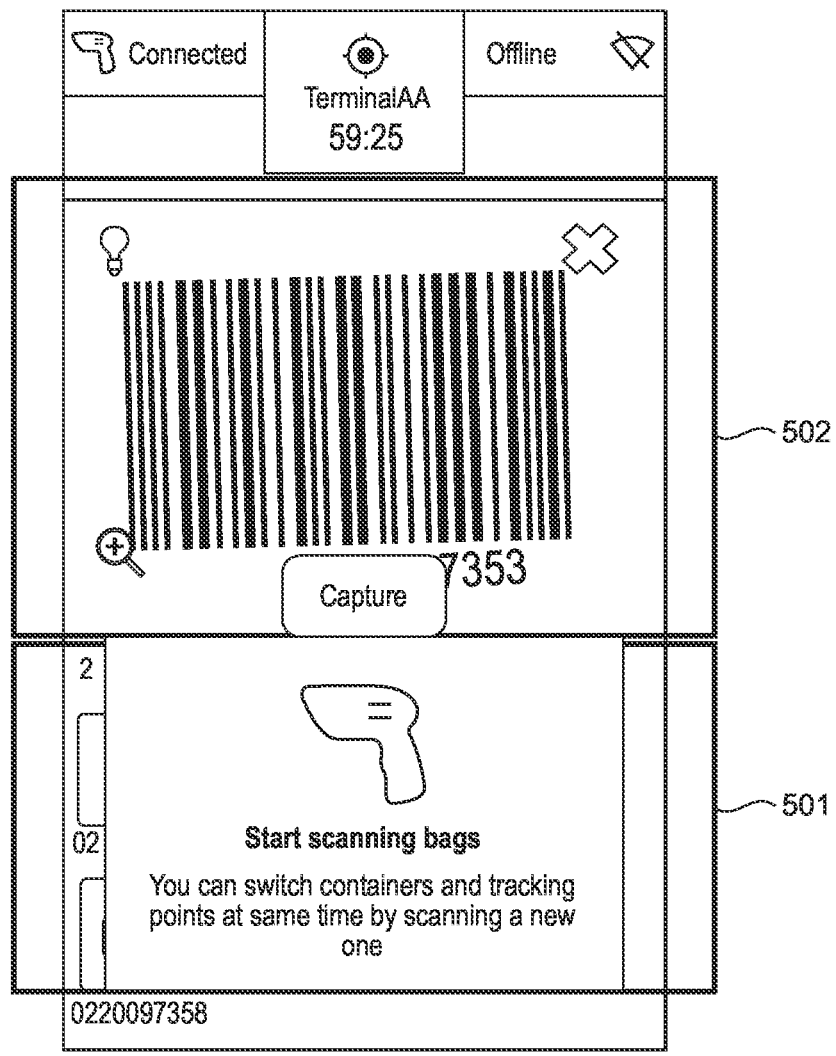
FIG. 5 shows an example GUI which displays a scanner preview window in addition to the notification that a user may begin scanning an article identifier.

Once the mobile application has been provided with valid location information, the scanning module of the mobile device scans a bag tag 101 associated with a bag 102. In the examples shown in FIGS. 4 and 5, the GUI may issue a notification 401 that a user may begin scanning bag tags. As shown in the example of FIG. 5, the GUI may display the notification to begin bag scanning 501 simultaneously with a scanner preview window 502 for enabling a user to align the scanner with a location identifier.

If a bag is known to the baggage handling system then the cloud platform may retrieve passenger-related information associated with the LPN of a particular bag from a BSM issued by the departure control system (DCS). There is therefore no requirement for a baggage handler to input the flight details for every bag that they process, hence advantageously saving time.

In some embodiments, the mobile application will be configured to request additional flight-related information. This may occur if passenger-related information associated with the baggage article being scanned cannot be retrieved, which occurs when the cloud platformdoes not contain a record of a BSM associated with a particular bag.

Figure 6:
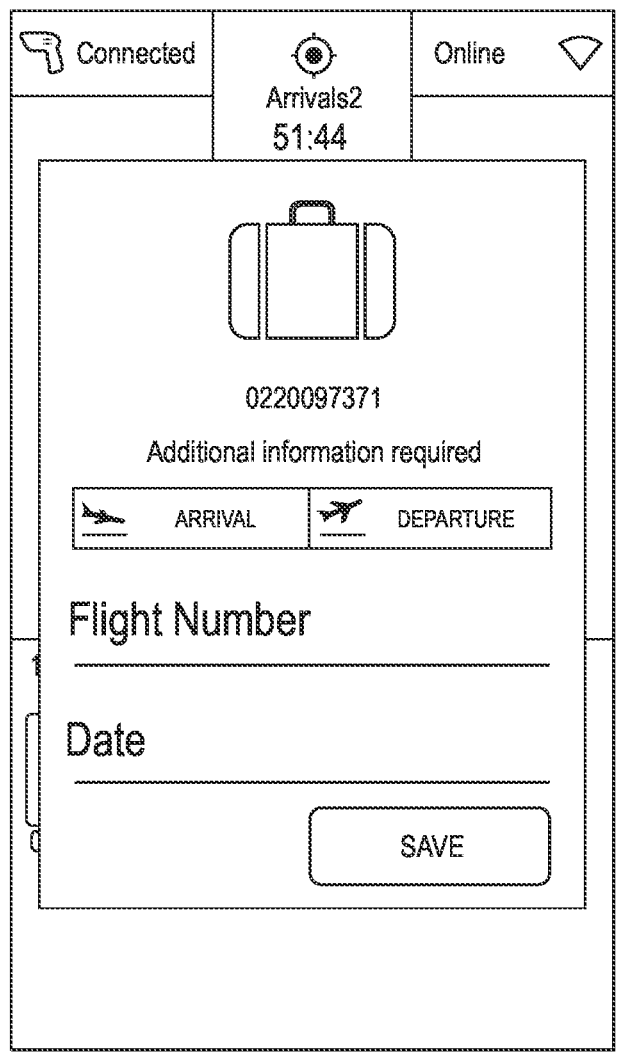
FIG. 6 shows an example GUI which displays a request for additional information related to the article being scanned.
Figure 7:
FIG. 7 shows the example GUI of FIG. 6, including additional information related to the article being scanned.
Figure 8:
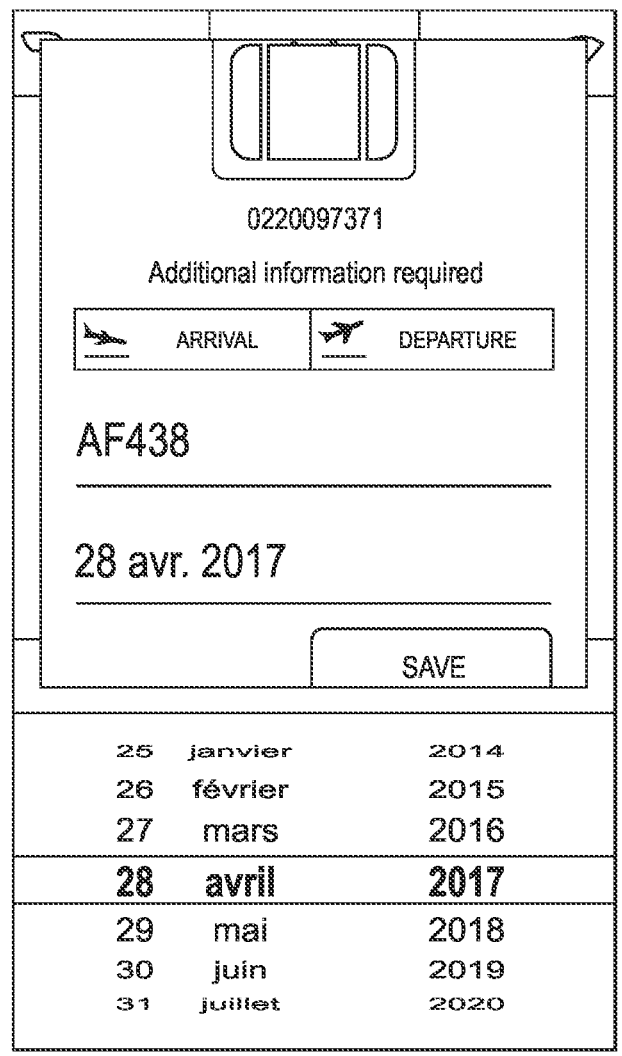
FIG. 8 shows the example GUI of FIGS. 6 and 7, including further additional information related to the article being scanned.

In that case, the mobile application detects that a bag is unknown on scanning the bag tag and will display a request for additional passenger-related information, as shown in the example of FIGS. 6 to 8. This step is only required when there is no record of the bag in the cloud platform. In the example shown in FIG. 6, the additional passenger-related information is the flight number and date of travel. FIGS. 7 and 8 show how the user may provide this information to the GUI. However, the additional information requested by the GUI may not always be passenger related. In some embodiments, the GUI may request more specific location information, for example if the baggage may be loaded into a choice of loading containers the GUI may issue a prompt to scan the unique identifier associated with the particular loading container.

The mobile application retains the manually inserted location information and additional flight-related information and associates that information with the LPN associated with any unknown bags. In the example shown in FIG. 9, three unknown bags have been provided with the same location and flight-related information, namely flight number AF438 to Geneva Airport on 28 Apr. 2017. Each scanned bag may be represented by a bag icon 901 which indicates the LPN associated with the bag to enable a user to distinguish between scanned bags and to correctly select a particular bag.

Figure 9:
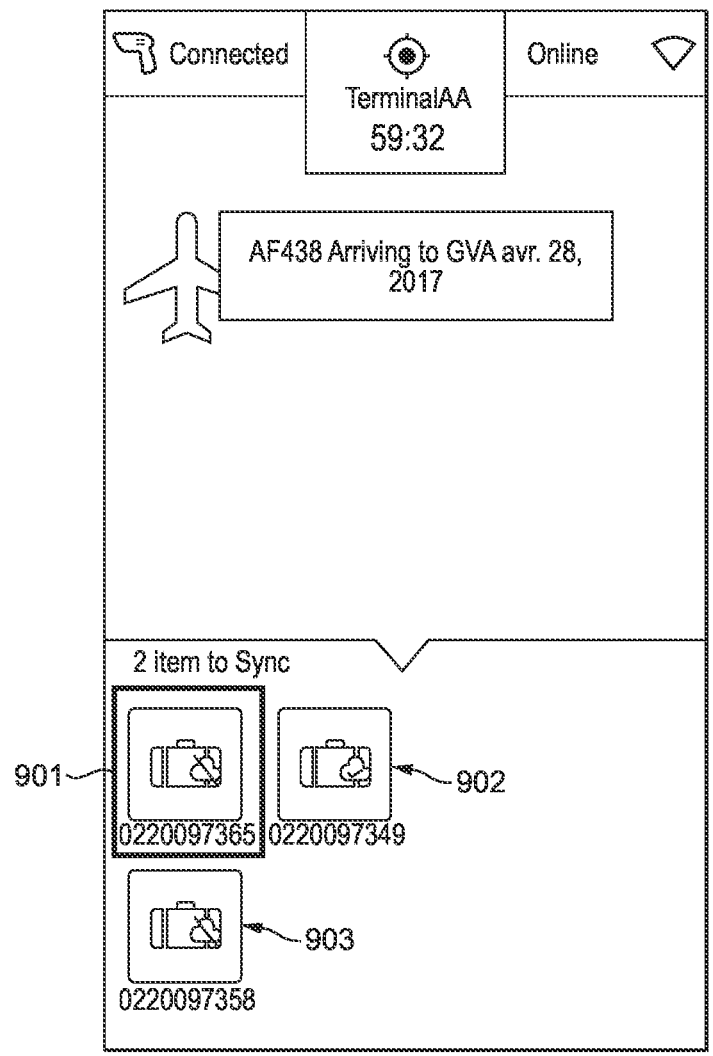
FIG. 9 shows an example GUI which displays scanned articles that have been provided with the additional information of FIG. 8.

Once the mobile application has acquired the above bag information, the mobile application generates an API payload 111 including the bag information and attempts to send the API payload to the API service 105 via a network. As shown in FIG. 9, the GUI may indicate whether the payload 111 has been successfully uploaded to the API service 105 by marking the bag icon associated with the bag with a tick 902. If the mobile application has been unable to upload the information associated with the bag, then the relevant bag icon is marked with a broken cloud 903. Failure to upload the bag information may be due to an error synchronising the bag data with the server. If a record of the LPN associated with the bag already exists in the cloud platform then the API data processor 106 may retrieve passenger-related data associated with the LPN and generate a BPM from the bag information obtained from the API payload 111 and the retrieved passenger-related data.

Figure 10:
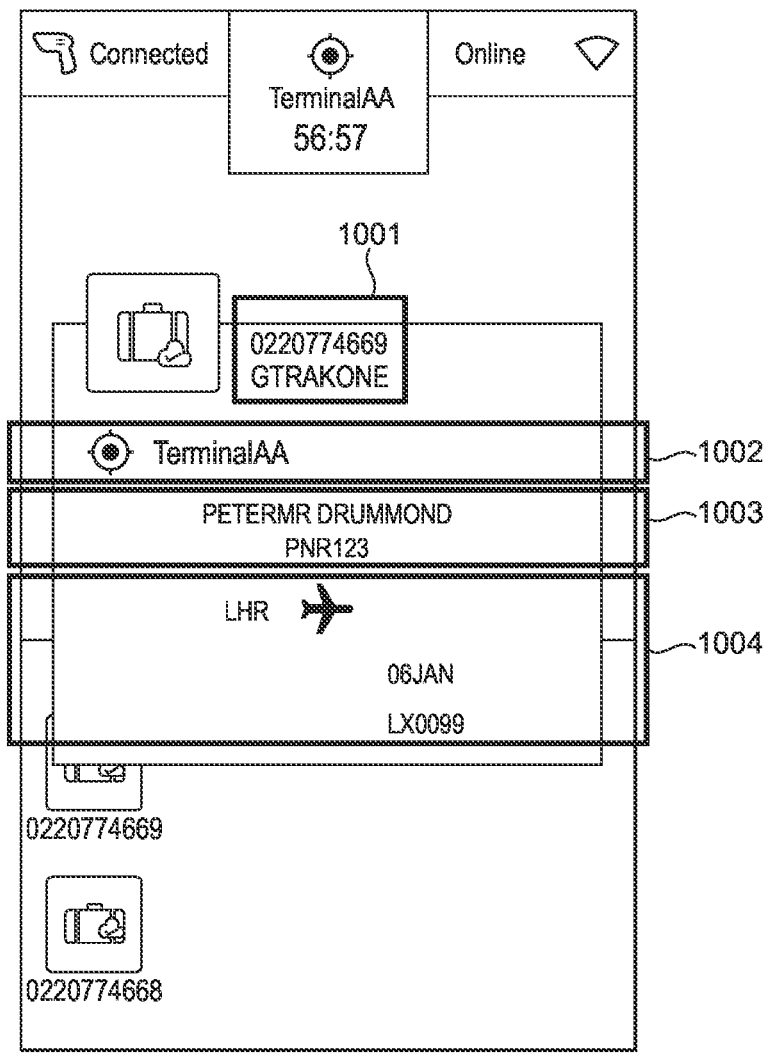
FIG. 10 shows an example GUI which displays information associated with a first article.
Figure 11:
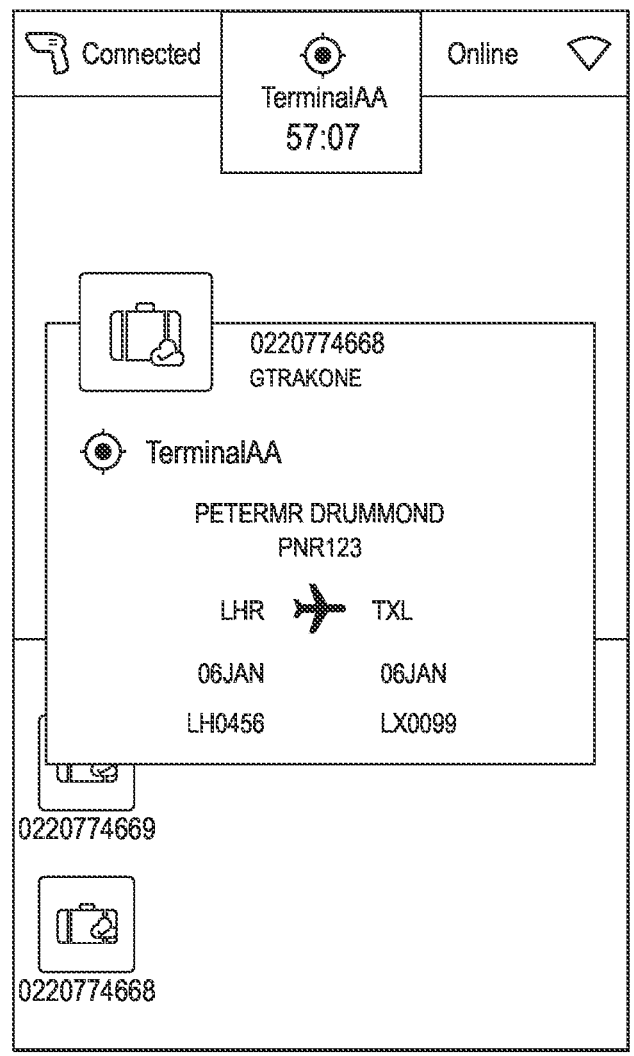
FIG. 11 shows an example GUI which displays information associated with a second article.
Figure 12:
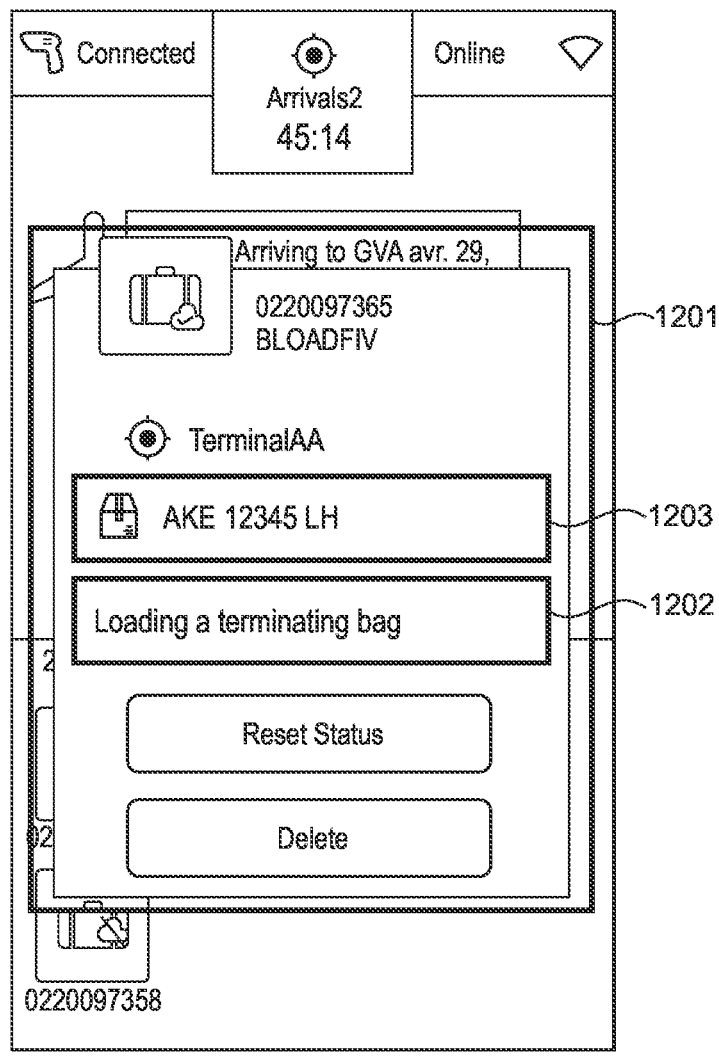
FIG. 12 shows an example GUI which displays information associated with a third article.

As shown in FIGS. 10 to 12, the GUI may display information associated with a particular bag when a user taps on the relevant bag icon 901. In a first example shown in FIG. 10, the GUI displays information including the LPN and tracking location 1001, most recent location data 1002, passenger name data 1003, and flight-related data 1004. In this example, the GUI indicates that the LPN associated with the bag is 0220774669, the most recent location of the bag is "GTRAKONE", which is situated in TerminalAA, the bag is associated with Mr Peter Drummond, and the bag will be travelling on flight LX0099 on 6 January. In a second example shown in FIG. 11, the GUI indicates that the LPN associated with the bag is 0220774668, the most recent location of the bag is "GTRAKONE" in TerminalAA, the bag is associated with Mr Peter Drummond, the bag has previously travelled on flight LH0456 on 6 January and will be travelling on flight LX0099 on 6 January.

If an error occurs during bag scanning, an error message is displayed by the GUI. In the example shown in FIG. 12, the error message 1201 includes text 1202 indicating that the bag is a terminating bag and should not be loaded onto the plane. The example shown in FIG. 12 also includes current location information 1203 which indicates the container that the bag has been loaded into. In the specific example shown in FIG. 12, the bag is loaded into container "AKE 12345 LH."

Figure 13:
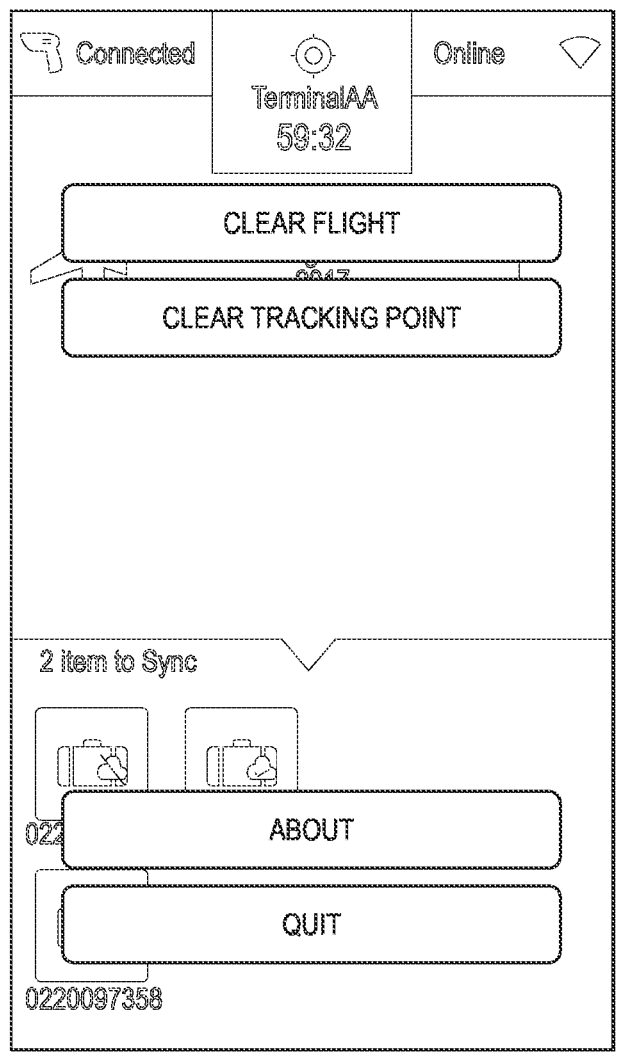
FIG. 13 shows an example GUI which displays options to clear data stored by the mobile application.

The mobile application may enable a user to clear the location or flight information that is associated with each scanned bag at any time, as shown in FIG. 13. This enables a baggage handler to associate new location and flight information for bags associated with a different flight. These options may be accessed from a menu on the GUI.

The mobile application described above has the advantage of only requiring minimal data to be captured for a bag to be successfully recorded by a back end database.

Embodiments of the invention may be used to perform 'bingo sheet' scanning. Here, a plurality of bag tag bar codes are stuck to a sheet of paper and all the bag tags can be recorded in a single scan. Thus, the steps of generating a message by combining the article information with the location information; b. applying a timestamp to the message; and c. transmitting the timestamped message via a transmitter of the mobile device; can be performed sequentially for a plurality of bag tags in a very short time in a single scanning action.

The mobile application GUI described above has the advantage of having a minimalist design, enabling a handling agent to focus on moving and scanning bags without needing to input manual data, apart from in exceptional circumstances, as there is no need to navigate into menus or complex settings. Embodiments of the invention are not specific to any one airline or airport hardware and software system and can therefore be used with any airline or airport system without requiring further customisation.

The above systems and methods may be used to enable a user to upload bag location information to a cloud platform, but may also be used to retrieve information from the cloud platform. For example, the mobile application can retrieve a status summary for the bags associated with a particular flight. Entering a particular flight number, for instance flight number "BA078", would result in obtaining status information for the bags associated with that flight. This may be achieved by sending an API request for the relevant flight and location data stored in data store 108 associated with that flight number. The status summary may provide the number of bags check in for the flight, the number of transfer bags received from other carriers which are due to be loaded onto the flight, the number of bags loaded onto containers due to be loaded into the aircraft, and the number of bags already loaded into the aircraft. This advantageously enables bag handlers to know whether any more bags are expected at any given time.

The mobile application can also be used to retrieve information associated with a particular bag, as described below with reference to the schematic workflows of FIGS. 14 and 15.

FIG. 14 shows an example schematic workflow 1400 for a member of airport staff querying the location of a particular bag using the mobile application.

In a first step 1401, a location identifier is scanned by a baggage handler. In this example, the location barcode is located at a first airport and is associated with a point of interest on a bag journey. In the specific example shown in FIG. 14, the location identifier is a barcode located at a plane-side loading point. In a second step 1402, a bag tag is scanned by the baggage handler. As before, scanning the bag tag retrieves an LPN associated with the bag. The LPN and bag location information are amalgamated and sent to the cloud platform as described above. In a third step 1403, the bag status is queried by staff at the destination airport. In this example, a passenger's bag may have been sent to the wrong destination. When arriving at their destination airport, which may be different to the first airport, the passenger may ask a member of staff at the destination airport the current location of their bag. The member of airport staff at the destination airport may use the mobile application to request the location information using the passenger's LPN or other passenger-related data. In a final step 1404, the bag event history is shown, with most recent event being the bag loaded onto the plane. The cloud platform database may return additional information relating to the last known scan location, including a text descriptor of the scan point, the latitude and longitude GPS coordinates of the scan location, and the scan time. In this example, the member of staff would be able to use the mobile application and tracking system to provide some peace of mind to the passenger by correctly informing them that their bag has been loaded onto the next flight to the destination airport.

FIG. 15 also shows an example schematic workflow 1500 for a member of airport staff querying the location of a particular bag using the mobile application to inform a passenger of their bag status.

In a first step 1501, a passenger complains their bag has not appeared on a carousel. In this example, a passenger's bag may have arrived at the destination airport, but may have been misplaced on the way to the arrivals bag carousel. In a second step 1502, staff query the database using bag tag data. The airport staff may use the mobile application to search for bag location information associated with an LPN, or other passenger-related data. In a third step 1503, staff can report last bag event, to confirm if the bag has been lost, or is still being unloaded, etc. In this example, the member of staff would be able to use the mobile application and tracking system to provide current information to the passenger. This provides a degree of certainty to the passenger so that they may either continue to wait to reclaim their bag, or to notify another member of staff that their bag is lost.

Embodiments of the invention have the advantage of improving on currently available systems by simplifying the process of "on-boarding" tracking services at locations currently not served with adequately required infrastructure, as well as locations who wish to extend their tracking capabilities at significantly reduced cost and effort. It also provides the advantage of creating more "portable" tracking opportunities due to the light-weight nature of the interface and numerous network connectivity options. A further advantage is that the claimed invention interfaces with legacy technology. This allows "modern" aspects of the network, such as mobile-based scanning, to interface with existing legacy infrastructure and to make use of the information within the legacy systems.

In the air transport industry, there is a well measured anxiety about the possibility of checked baggage being lost, stolen, delayed, or damaged. Although these eventualities are rare, passengers remain unaware of the precise location and status of their baggage throughout much of their journey. Embodiments of the invention therefore have the advantage of reassuring passengers that their baggage has been processed properly by sending baggage status notifications to a passenger through a mobile application.

In another embodiment, the API Data Processor 106 may also send the generated BPM 113 to baggage handling systems or other systems storing passenger information. Sending BPMs to baggage handling systems enables embodiments of the invention to effectively communicate data associated with tracking a baggage article to existing systems.

The above detailed description of embodiments of the invention are not intended to be exhaustive or to limit the invention to the precise form disclosed. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. As indicated above, the invention enables tracking an article in any large venue, including, but not limited to, shopping centres, sports stadia, commercial premises, academic institutions and performance venues. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure.

The invention claimed is:

1. An article handling system comprising:
   one or more article tags (101) associated with an article (102), the one or more article tags (101) configured to provide a first article identifier associated with the article (102) and a second article identifier associated with one of the article tags (101);
   a mobile device (104) having scanning means for scanning the one or more article tags to obtain the first and second article identifiers; and
   a mobile application stored on the mobile device (104), the mobile application configured to:
   a) generate a message comprising:
      i) a first message line including the first article identifier, and
      ii) a second message line including the second article identifier; and
   b) send the message to a location;
   whereby the article is subsequently identified at the location using either or both of the first and second article identifiers.

2. The article handling system of claim 1, wherein at least one of the one or more article tags is an electronic radiofrequency article tag.

3. The article handling system of claim 2, wherein the at least one electronic radiofrequency article tag is a passive type or an active type.

4. The article handling system of claim 1, wherein the message comprises a third message line including a location identifier for providing location information related to the current location of the article.

5. The article handling system of claim 1, wherein the first article identifier is a baggage license plate number, or wherein the second article identifier is one or more of a tag identifier (TID), a universally unique identifier (UUID), a globally unique identifier (GUID), a Bluetooth Low Energy universally unique identifier (BLE UUID), or passenger related information, or wherein the message is a baggage information message (BIM).

6. The article handling system of claim 5, wherein the first message line is defined by a .N element of the BIM, or wherein the second message line is defined by a .M element of the BIM.

7. The article handling system of claim 1, wherein the message is sent to BIM processing systems at the location.

8. The article handling system of claim 1, further comprising a transform module configured to change the generated message from a first format into a second format.

9. An article handling method comprising:
   associating one or more article tags with an article, the one or more article tags providing a first article identifier associated with the article and a second article identifier associated with one of the article tags;
   obtaining the one or more article identifiers at a mobile device by scanning, with the mobile device, the one or more article tags;
   generating, with a mobile application stored on the mobile device, a message comprising:
   a) a first message line including the first article identifier, and
   b) a second message line including the second article identifier; and
   sending the message to a location;
   whereby the article is subsequently identified at the location using either or both of the first and second article identifiers.

10. The article handling method of claim 9, wherein obtaining the second article identifier is achieved by scanning the one or more article tags optically or electronically.

11. The article handling method of claim 9, wherein the message is sent to BIM processing systems at the location, and wherein the location is an origin airport, a transfer airport or an arrival airport.

12. The article handling method of claim 9, further comprising transforming the generated message from a first format into a second format, wherein the first format is JSON format and the second format is teletype format.

13. A non-transitory computer-readable medium embodying a computer program product which when executed, by at least one computing device, causes the at least one computing device to:
   associating one or more article tags with an article, the one or more article tags providing a first article identifier associated with the article and a second article identifier associated with one of the article tags;
   obtaining the one or more article identifiers at a mobile device having scanning means by scanning, with the mobile device, the one or more article tags;
   generating, with a mobile application stored on the mobile device, a message comprising:
   a) a first message line including the first article identifier, and
   b) a second message line including the second article identifier; and
   sending the message to a location;
   whereby the article is subsequently identified at the location using either or both of the first and second article identifiers.

14. The article handling system of claim 2, wherein the at least one electronic radiofrequency article tag includes a memory chip storing a tag identifier (TID) that uniquely identifies the tag, and wherein the TID comprises a hexadecimal code.

15. The article handling system of claim 1, wherein the second article identifier is readable optically or electronically.

16. The article handling system of claim 2, wherein the second article identifier is different to the first article identifier.

17. The article handling system of claim 2, wherein the at least one electronic radiofrequency article tag is a permanent type or a temporary type.

18. The article handling system of claim 6 wherein the .M element includes a plurality of rows each of the rows being associated with a different article identifier.

19. The article handling system of claim 7, wherein the location is an origin airport, a transfer airport or an arrival airport.

20. The article handling system of claim 8, wherein the first format is JSON format and the second format is teletype format.

* * * * *